Patented May 11, 1948

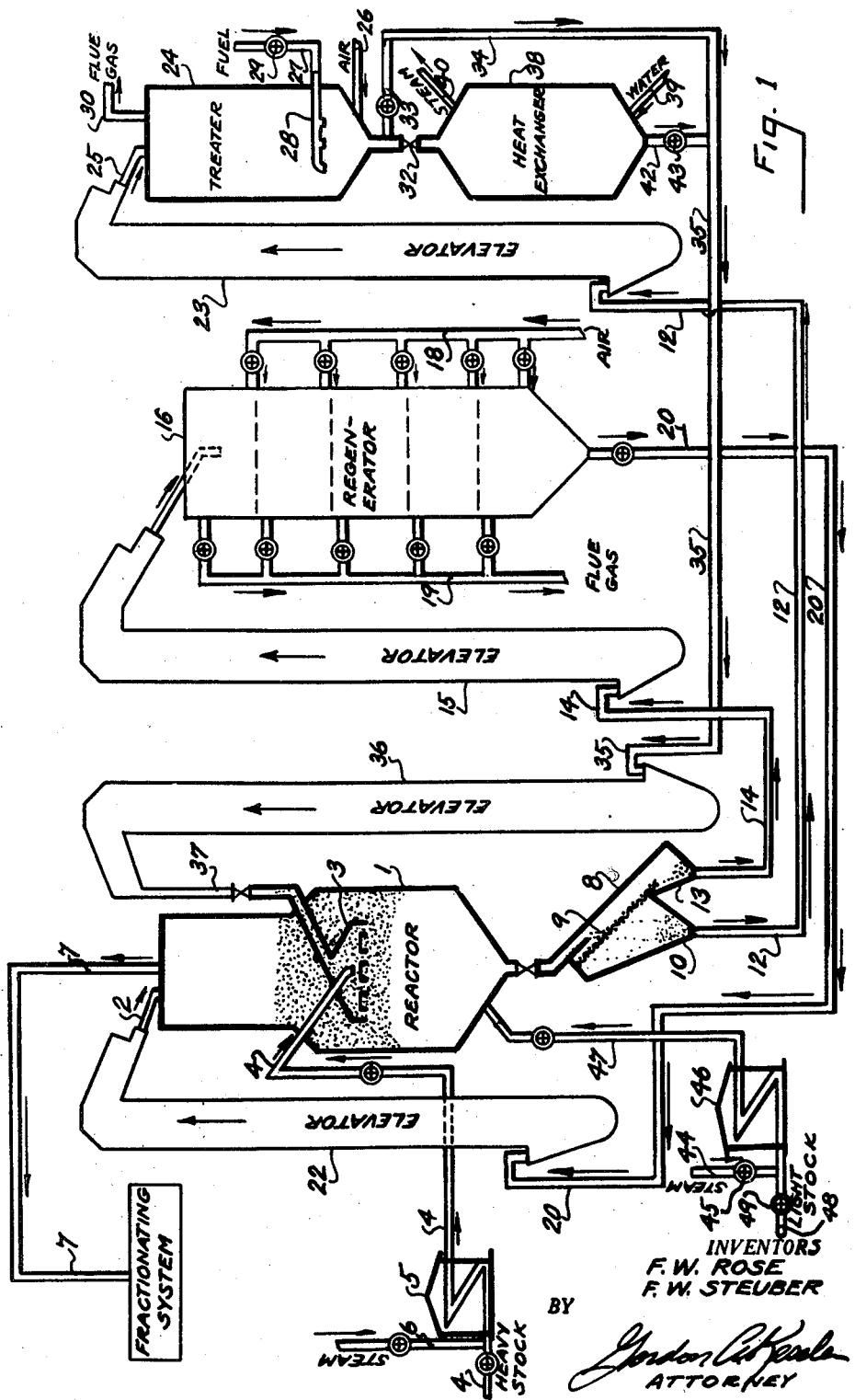

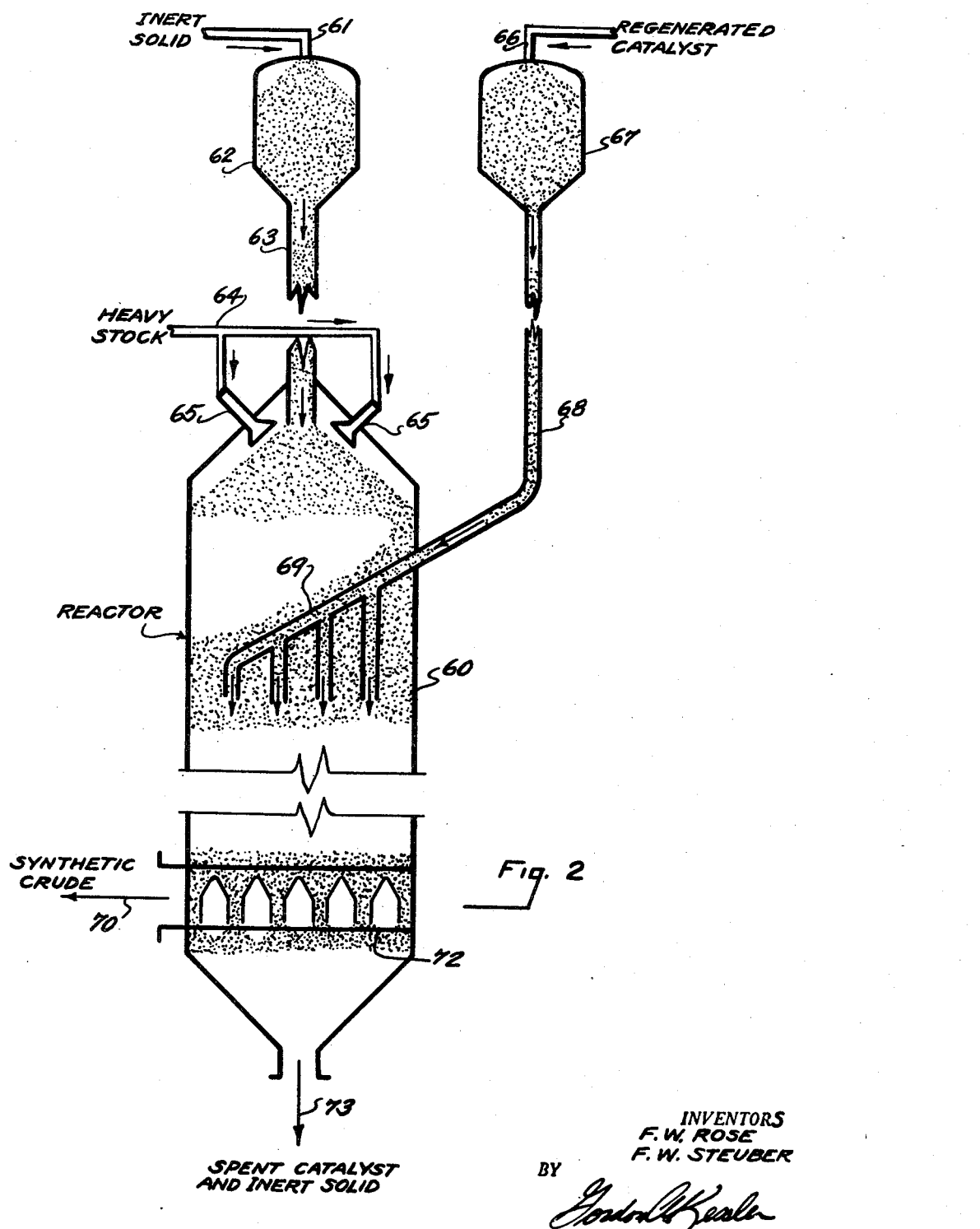

2,441,170

UNITED STATES PATENT OFFICE 2,441,170

HYDROCARBON CONVERSION BY CONTACT WITH ACTIVE CATALYST AND INERT SOLID HEAT CARRYING MATERIAL

Frank William Rose and Frederick Walter Steuber, Swarthmore, Pa., assignors to Houdry Process Corporation, Wilmington, Del., a corporation of Delaware Application June 14, 1945, Serial No. 599,344

18 Claims. (Cl. 196—52)

The present invention relates to processes for converting hydrocarbons by fluent solid catalysts while making efficient use of the heat involved in such processes. The invention is concerned particularly with processes for the cracking of heavy or high boiling petroleum fractions which are difficult to vaporize or which thermally decompose during vaporization.

An important phase of modern petroleum technology is the conversion of hydrocarbons into other hydrocarbons of different molecular structure where the changes are directed and accelerated by contacting hydrocarbon vapors with solid catalysts at the proper conversion conditions of temperature, pressure, and catalyst to oil ratio. The conversion process can be made continuous by using a fluent solid catalyst which passes continuously through the conversion zone. Like any solid, the catalyst becomes fluent or capable of flow when in a granular or pulverulent form, such as particles from 5 microns to 5 millimeters in size. The larger sizes can be handled as a moving bed and the smaller sizes can be aerated by a gas and handled somewhat like a fluid. The fluent catalyst then moves in a circuit containing a reaction zone in which hydrocarbons are contacted and converted and a regeneration zone in which coke is burned off the spent catalyst.

The conversion of the higher boiling petroleum fractions has been complicated by the difficulty of processing charge stocks which contain considerable amounts of material boiling above the conversion temperature or which thermally decompose during vaporization. Steam aids the vaporization and processing of heavy charge stocks, but many such stocks require so much steam that the steam becomes an important item of operating expense. Furthermore, high concentrations of steam adversely affect the activity of certain cracking catalysts in present commercial use, and hence reduce their active life. In commercial practice, heavy charge stocks containing asphaltic materials have been avoided because such materials produce large amounts of coke and the regeneration of the catalyst is consequently more difficult to control. The addition of a process to deasphaltize such charge stocks increases the processing costs.

An object of the present invention is to provide new and improved processes for the catalytic conversion of high boiling hydrocarbons.

The present invention is particularly concerned with conversion processes in which high boiling, difficultly vaporizable charge stocks are efficiently treated. The conversion process can be, for example, a cracking operation in which lower boiling products such as gasoline are produced, a dehydrogenation or hydrogenation operation either with or without cracking, or the like. The present invention has particular application to processes for the catalytic cracking of high boiling stocks, and the following discussion will be largely concerned with such operations.

According to the present invention, hydrocarbon charge stocks, such as those whose vaporization at conversion temperature is difficult, are introduced together with a relatively inert fluent solid into a cracking zone through which a fluent solid catalyst is moving. A relatively inert fluent solid is employed which is physically separable from the catalyst and which preferably has high heat capacity. The inert solid may be porous or non-porous, but, in any event, it is employed in small pieces or particles so that sufficient surface is available to insure a rapid and efficient flow of heat from the solid to the charge stock and also so that adequate surface is provided for carrying into the cracking zone any charge stock that is not immediately vaporized. After the charge stock and the fluent solid are introduced into the cracking zone, they are mixed with the catalyst and the cracking of the charge stock is accomplished. This mixing can be at various points in the cracking zone according to the needs of the process. Thus, the fluent solid catalyst may be introduced at an intermediate point in a bed of relatively inert fluent solid moving downward or the relatively inert fluent solid and the charge stock may be introduced at an intermediate point in a bed of fluent solid catalyst moving downward. The reaction products, except for coke deposited on the catalyst and on the fluent solid, are in the vapor phase and are removed from the conversion zone. The catalyst and relatively inert solid are either separately removed from the cracking zone or are removed together and separated outside of the zone. In either case, the relatively inert fluent solid is subsequently treated, as for the removal of coke by burning, independently of the catalyst before return to the reaction zone. A closely controlled and variable supply of heat to the reaction zone is thus provided by regulating the quantity and/or temperature of the relatively inert solid with respect to the quantity and temperature of the catalyst. This control is independent of the temperature and quantity of the catalyst as admitted to the reaction zone. Therefore, the relatively inert fluent solid provides a supply of heat to the reaction zone which is controlled independently of the catalyst and which is used to regulate catalyst temperatures or to prevent changes in the temperature of the catalyst resulting from vaporization of the charge stock and from the endothermic heat of cracking. Because a material which is not adversely affected by high temperatures can be selected for use as the relatively inert fluent solid, it can be contacted with the oil or regenerated at high temperatures that would injure the catalyst.

The present invention has distinct advantages when used for the processing of heavy charge stocks that have a dew point higher than 850° F., although other charge stocks may be used if desired. (As used herein, the term, the dew point of a hydrocarbon mixture, refers to the temperature below which formation of liquid takes place at atmospheric pressure. It will be understood, of course, that to avoid thermal decomposition the dew point at atmospheric pressure will usually be calculated from data obtained at reduced pressure, and that the hydrocarbon mixture will be free from other materials.) Heavy stocks are stocks generally boiling above 400° F. (end of gasoline range) and are generally either virgin or recycle petroleum fractions that are less than about 50 per cent vaporized at 650° F., and can have varied boiling ranges, as, for example, a boiling range as wide as 440 to over 1100° F. or a narrower boiling range such as 600 to 1050° F. Regardless of the width of the boiling range of a charge stock or a hydrogen mixture, if the dew point is above about 850° F., thermal decomposition during vaporization can be appreciable. The present invention avoids coking difficulties during vaporization by preheating of heavy charge stocks, such as those less than 95 per cent vaporized at 800° F., to temperatures below the coking point and then using a hot relatively inert fluent solid to supply the additional heat necessary to raise the charge stock to the cracking temperature. Stocks which vaporize cleanly without coke formation can be preheated to higher temperatures in practicing the invention. Despite the fact that heavy charge stocks commonly contain asphaltic materials, such stocks can be used in the present invention without treatment to remove asphalt because a large percentage of coke resulting from decomposition of the asphaltic materials is deposited on the relatively inert fluent solid and not on the catalyst. In the present invention, the asphaltic materials are left on the relatively inert fluent solid which preferably is of a refractory nature and can be heated to the high temperatures caused by a rapid combustion of the coke.

It is within the scope of the present invention to use, as charge stocks, petroleum fractions which have been treated prior to cracking in order to reduce the amount of coke deposited. The present invention can also be used in the processing of charge stocks whose dew point is lower than the conversion temperature such as gasolines, naphthas, and light gas oils. Such light charge stocks can be contacted with the inert solid and completely vaporized by the heat furnished by the inert solid. The heat content of the inert solid can be used, as it is with the heavy charge stocks, to compensate for the endothermic heat of cracking in the cracking zone.

Another advantage in the present invention arises from the independent treatment of the relatively inert fluent solid and the fluent solid catalyst outside of the cracking zone. The present invention separates the functions of catalyst action and heat capacity by using two materials, each of which is suited to the function which it performs. When only the catalyst is used to transfer heat from the regeneration zone to the cracking zone, the amount of heat so transferred is limited, among other factors, by the difference in temperatures existing between the two zones and hence, in commercial operations, by regeneration temperatures consistent with maintenance of activity. The amount of heat transferred in a given interval of time is a product of the specific heat of the catalyst, the temperature difference between the regeneration zone and the cracking zone, and the amount of catalyst transferred from one zone to another in that interval of time. If more heat is desired in the cracking zone, either the temperature in the regeneration zone must be raised or the flow of catalyst increased. Since often any increase in the regeneration temperature will exceed the safe limit, an increased heat transfer is generally realized by increasing the rate of flow of the catalyst. The reaction conditons must thereafter be changed to accord with the increased circulation of catalyst through the system. If a mixture of catalyst and inert material is being circulated in the system, a change in the heat requirement necessitates changing the relative proportions of these materials by the addition of the desired constituent. In the present invention, the heat used in the cracking zone to compensate for the heat of cracking and to heat the feed stock is furnished by the heat content of the relatively inert fluent solid. The amount of heat used in the cracking zone for these purposes can be therefore increased without disturbing the treatment or flow of catalyst. Furthermore, by selecting a relatively inert fluent solid of a refractory nature, it can be heated to any desired temperature and introduced into the cracking zone. The flow of the catalyst within the cracking zone is thereby made independent of any heat requirements and can be adjusted so that the process is operated at optimum efficiency unhampered by restrictions imposed by the heat requirements.

Since the relatively inert fluent solid can be used in direct heat exchange, excess heat in the process can be utilized more efficiently than if the heat were removed by indirect heat exchange with the catalyst. The heat balance of most catalytic cracking processes shows an excess of heat; i. e., the heat of cracking is less than the heat of combustion of the coke. In the present invention, considerable amounts of the coke are deposited on the relatively inert fluent solid and the combustion of coke will thereby increase the heat content of this material. According to the present invention, a portion of the relatively inert fluent solid heated by combustion of the coke deposited thereon, can be contacted with any desirable heat transfer fluid and a portion of the heat contained thereby removed. Alternately, the relatively inert fluent solid can be used in another process involving fluent catalysts in which there is a deficiency of heat, such as processes for the dehydrogenation of butanes and the like.

A material to be used as the relatively inert fluent solid is selected or processed so that it is easily separated from the fluent solid catalyst. Also, the material should have no undesirable catalytic activity and should be able to withstand the temperatures involved in the particular process. One of the advantages of the present invention is that the relatively inert fluent solid can be a material that is unaffected by temperatures or treatments ruinous to the catalyst. The separation can be accomplished by any conventional means of physically separating two solids different in physical properties and should be adapted to the particular type of fluent catalyst employed. When practicing the present invention in connection with moving beds of catalyst, the relatively inert fluent solid is mixed with the granular catalyst and thereafter moves concurrently with the catalyst until separated. It is preferred to separate the relatively inert fluent solid and the fluent catalyst on a basis of size, thus, one material can be fine and the other relatively coarse. The separation can be made by flowing the mixed materials over a fixed screen, by a vibrating screen, a rotating inclined cylindrical screen, an air classifier, and the like. Where the presence of such materials is not deleterious to the catalytic process, either the relatively inert fluent solid or the fluent catalyst can include ferromagnetic material. Various methods for separation of two materials different in magnetic properties are well known and may be applied to the present invention. Also, the relatively inert fluent solid and the fluent catalyst can be classified by shape; i. e., one material can be spherical and the other irregular in shape. Another method of classification is based on different buoyancies in an upwardly flowing stream of gas.

Since a function of the relatively inert material is to transfer heat, its heat capacity is preferably high and materials are suitable whose specific heats are greater than 0.15 and preferably above 0.20. Considerable efficiency in heat transfer can be realized when the material has not only a high specific heat, but is also dense so that the volumetric heat capacity is high. One of the advantages of the present invention over a process that depends on the catalyst for heat transfer is that, in the latter process, the catalyst must be selected primarily for its catalytic properties and secondly for its heat capacity, whereas, in practicing the present invention, heat is transferred by a relatively inert fluent solid selected with regard to heat capacity. The relatively inert fluent solid should be capable of withstanding high temperatures of the order of 1000 to 2000° F. without deterioration and should not react chemically with materials used in the process. Suitable materials which possess the desired properties of heat capacity, resistance to high temperatures, and chemical inactivity are oxides of the second, third and fourth groups of the periodic table as exemplified by corundum, fused quartz, zirconia, and commercial modifications of these materials such as sand, "Alundum," "Corhart" and the like. Infusible metals can be used in the free state, but the metal should be selected so that it does not have an adverse catalytic effect. Various silicates, carbides, dead burned ores such as magnesite, chromite, and crude rare earths, natural refractories, crushed igneous rocks, and the like may also be used. A small amount of catalytic activity in the material used for the relatively inert fluent solid is not precluded in the present invention. Such catalytic activity should be relatively minor as contrasted to the catalytic activity of the catalyst (less than 15 as measured by the tests given in "National Petroleum News," 36, No. 31, R–537–38). Any considerable amount of catalytic activity, such as that produced by any inclusion in the relatively inert solid of fines resulting from attrition of the catalyst, will be rapidly diminished due to the high temperatures to which the relatively inert fluent solid is subjected. In some operations, it may be desirable to select a relatively inert solid that has a small amount of catalytic activity in order that the coke deposited on this material will be sufficient to maintain a desired heat balance. Because the present invention can be applied to a wide range of processes, no exact rules for the selection of the relatively inert fluent solid can be formulated, but a suitable material can be selected for any particular process.

The invention will now be described more in detail in connection with the accompanying drawings in which Figures 1 and 2 are diagrammatic flow diagrams illustrating the application of the invention to two types of cracking processes.

Figure 1 is a diagrammatic flow diagram illustrating an embodiment of the present invention as applied to the art of cracking by means of a moving bed of catalyst. The use of fluent catalysts in moving beds is a well known process and has been described in the literature (see for example, a paper by Newton, Dunham and Simpson in "Transactions of the American Institute of Chemical Engineers," page 215, April, 1945, and the articles there cited). Freshly regenerated catalyst, in the form of particles or pellets, is charged to the top of a reactor 1 by line 2 and moves downwardly as a bed. A relatively inert fluent solid is charged to the reactor through manifold 3 and mixes with the catalyst. A heavy charge stock, such as a reduced crude having a dew point above 850° F., passes by line 4 through a furnace 5 and is brought in contact with the relatively inert fluent solid in the manifold 3. Steam can be added to the charge stock by line 6. The temperature of the relatively inert fluent solid has been adjusted so that it supplies the heat necessary to bring the heavy stock to at least the cracking temperature. Vapors of the heavy stock, produced either by passage through the furnace 5 or by contact with the hot relatively inert fluent solid in manifold 3, emerge from the manifold 3 and pass upwardly in countercurrent contact with the catalyst and are thereby catalytically cracked. The cracked hydrocarbon vapors are removed from the top of the reactor 1 by line 7 and thereafter pass to a fractionating system and are appropriately processed. The relatively inert fluent solid, carrying the unvaporized portion of the heavy stock, mixes with the catalyst and further cracking of the nonvolatilized heavy stock occurs. The products thus formed pass upward and join the other hydrocarbon vapors. The moving bed of solid materials is discharged from the bottom of the reactor 1 into a separator 8 where it falls on a screen 9. The relatively inert fluent solid is a material finer than the catalyst and therefore falls through the screen 9 into a hopper 10 from which it is removed by line 12. The coarser catalyst, which is retained on the surface of the screen 9, moves down over the screen and discharges into a hopper 13. Used catalyst in the hopper 13 is conveyed by line 14 to an elevator 15 which carries the coked catalyst to the top of a regenerator 16 into which it discharges by line 17. The regenerator 16 is a kiln, such as a "Thermofor" kiln, into which air is introduced at a number of points from manifold 18 and in which the temperatures of the various sections are controlled by a number of heat exchange units (not shown) placed at intervals along the vertical length of the regenerator. Flue gas is removed from the regenerator by manifold 19 and thereafter passes to appropriate devices for the separation of any fine catalyst that may have been carried out of the regenerator. The regenerated catalyst is removed from the bottom of the regenerator 16 and is conveyed by line 20 to elevator 22 which recharges it to the reactor 1 through line 2. The relatively inert fluent material is removed from hopper 10 and conveyed to elevator 23 by line 12. The elevator 23 carries the relatively inert fluent material to the top of the treater 24 to which it is charged by line 25. The relatively inert fluent solid moves downwardly through the treater 24 and is contacted therein by air introduced through line 26. In this manner, any carbonaceous residue on the relatively inert fluent solid will be burned off and the relatively inert fluent solid consequently heated. If the combustion of carbonaceous residue left on the relatively inert fluent solid furnishes an amount of heat that is inadequate to raise the material to the desired temperature, additional heat can be furnished by the introduction of fuel from line 27 through manifold 28. The amount of fuel introduced can be adjusted by valve 29. The fuel used can be waste gases or heavy tars from the cracking process or any similar material. The flue gas formed by combustion of the fuel or coke in the treater is removed from the top of the treater by line 30. The hot relatively inert fluent solid can be charged to the reactor 1 directly from the treater 24 by closing valve 32, opening valve 33 and returning the relatively inert fluent solid through lines 34 and 35 to the elevator 36 which charges it to stand pipe 37.

If the heat produced by the combustion of the coke associated with the relatively inert fluent solid exceeds the heat requirements in the cracking zone, the heat content of the relatively inert fluent solid can be reduced before returning it to the reaction zone. This is done by discharging the hot relatively inert solid from treater 24 into a heat exchanger 38 by opening valve 32 and closing valve 33. In the heat exchanger, heat is removed from the relatively inert solid by contact with an appropriate fluid such as water introduced by line 39. The water is converted to steam by direct heat exchange, passes upward through the relatively inert fluent solid moving downward and passes out of the heat exchanger by line 40. The heat content of all of the relatively inert fluent solid may be reduced by a desired amount in heat exchanger 38 or a portion of the relatively inert fluent solid can be bypassed around the heat exchanger by proper adjustment of valves 32 and 33. A portion of relatively inert fluent solid thereby passes through line 34 and is later combined with the material from the heat exchanger discharged through line 42. The rate of discharge from the treater is adjusted by valve 43. If all of the relatively inert fluent solid is passed through the heat exchanger, the desired reduction in temperature can be realized by controlling the amount of heat exchange effected therein. The hot relatively inert fluent solid thus treated is conveyed by line 35 to elevator 36 which carries it to stand pipe 37 for return to the reactor 1.

Steam or a light petroleum fraction which completely vaporizes can be passed upward through the bed of commingled catalyst and relatively inert solid. Steam from line 44 is introduced to the bottom of the reactor 1 by opening valve 45, preheating the steam in furnace 46, and charging the preheated steam to the bottom of the reactor by line 47. Similarly, light stock in line 48 can be charged to the bottom of the reactor by closing valve 45, opening valve 49, vaporizing the stock in furnace 46, and charging it by line 47. The hydrocarbon and/or steam introduced at the bottom of the reactor passes upward through the downwardly moving bed of commingled catalyst and relatively inert solid and aids in the volatilization and cracking of the liquid feed stock carried along by the relatively inert fluent solid.

Figure 2 is a schematic diagram of a reactor 60 illustrating another embodiment of the invention in which the feed stock contacts a moving bed of relatively inert fluent solid which thereafter mixes with fluent catalyst. The reactor 60 shown can be substituted for the reactor 1 in Figure 1. A hot relatively inert fluent solid is charged through line 61 to hopper 62 and passes to the reactor by a stand pipe 63. The relatively inert fluent solid forms a bed in the reactor which moves downward as material is removed from the bottom. A heavy feed stock, previously heated, is charged through line 64 to spray heads 65 which distribute the feed stock over the top surface of the bed of the relatively inert fluent solid. Freshly regenerated catalyst is charged through line 66 to a hopper 67 and passes by line 68 to a manifold 69 where it is mixed with the bed of relatively inert fluent solid moving downward. Vapors of the heavy stock produced either by preheating or by contact with the relatively inert fluent solid pass downward through the bed of commingled catalyst and relatively inert fluent solid and are disengaged from the solids and removed by line 70. The fluent catalyst and the relatively inert fluent solid carrying the liquid portion of the feed stock move downward through the reactor as a bed. During the downward passage of the solid materials, further cracking of the nonvolatilized heavy stock occurs and the cracked hydrocarbon vapors mingle with the other hydrocarbon vapors and are removed. The commingled catalyst and relatively inert fluent solid move through a disengaging section 72 and thence to the bottom of the reactor from which it is discharged. The spent catalyst and inert material in line 73 are thereafter treated as described in connection with Figure 1.

The conditions of cracking in reactor 1 are well known to the art and, in general, are included in the ranges, 750 to 1100° F., about atmospheric to 100 pounds per square inch pressure, and a catalyst to oil ratio of 0.1 to 5. The more severe conditions of cracking (higher temperature, higher pressure, and higher catalyst to oil ratio) are used for the more refractory or lower boiling stocks. The higher conditions of temperature can be used where a high content of aromatic or olefinic hydrocarbons in the product is desired. The catalyst used may be in any convenient form such as extruded or molded pellets, formed spheres or beads, or crushed or sized particles.

Among the various catalysts which can be used are acid-treated clays such as montmorillonite clays, prepared silica-alumina gels, prepared silica-zirconia gels, zirconium phosphate, prepared silica-urania gels or mixtures of these and similar materials. The catalytic activity of any particular composition is adjusted to accord with the operation to be performed. The conditions of operation should include control of the temperature of regeneration. With present commercial catalysts, it is preferred to use temperatures of regeneration not over about 1100° F. In fact, all the heat requirements can be met while utilizing regeneration temperatures which are low enough to prolong the life of the catalyst. Since, in practice of the invention, the heat requirements for the cracking reaction are met independently of the heat content of the catalyst charged to the reaction zone, the catalyst need not be heated to excessive temperatures in the regenerator in order to meet heat requirements in the reactor.

Several different methods have been shown for the flow and treatment of the relatively inert fluent solid after its discharge from the reactor. The use of any particular method for a given operation will depend upon the type of charge stock used. Stocks, having dew points above 850° and therefore liable to coke during vaporization, can be preheated to less than 850° and then contacted with a sufficient amount of the relatively inert fluent solid heated to temperatures above 850° and preferably below 1500° F. to furnish sufficient heat to heat the charge stock to at least the conversion temperature. Charge stocks will vary considerably in the amount of coke-like material deposited on the relatively inert fluent solid and the distribution of heat can be modified by changing the treatment of the relatively inert fluent solid. The flow of reactants and products can be changed to suit any particular operation. Thus, in reactor 1, the products can be taken off by line 47 and steam or a light stock charged by line 7.

It should be noted that the invention has been described in connection with Figures 1 and 2 which are merely schematic diagrams. In the interest of clarity and simplicity, considerable conventional equipment has been omitted from these figures but it is to be understood that, in practice, such equipment will be supplied. For example, conventional methods of introducing or removing fluent solids from operating zones may be used such as star valves, pocket rotary valves, screw conveyors, hoppers, stand pipes and the like. Also, the fluent solids may be transferred by equipment designed for this purpose such as screw conveyors, elevators, pneumatic lifts, and the like, and materials passing from one zone to another zone will be properly purged of gases or liquids which would interfere with the operation of the succeeding zone. Thus, for example, the catalyst removed from a reaction zone is purged with steam or some inert gas in order to remove from the catalyst any occluded gases or vaporizable liquids that would interfere with subsequent operations such as regeneration.

The processes described above illustrate only a few typical applications within the scope of this invention. Many variations are possible without departing from the spirit of the invention. For example, in Figure 1 or 2 the relatively inert fluent solid may be coarse and the catalyst fine, the charge stocks described above as petroleum fractions can be any hydrocarbon material of the same specifications regardless of source, and the process can be used for an exothermic reaction as well as an endothermic. Although the invention has been described in connection with operating zones in which the reactions were essentially gaseous, the invention is applicable to processes where the reactants are liquid as in a hydrogenation operation to produce superior lubricating oils. The invention can be practiced when using methods of moving the catalyst other than as a moving bed; thus for example, when the catalyst is fine it may be aerated by gas and handled in a fluid or fluidized state. It will be accordingly understood by those skilled in the art that the processes disclosed may be varied within the scope of the invention and that only such limitations should be imposed on the invention as are indicated in the appended claims.

We claim as our invention:

1. In the conversion of hydrocarbons by contact in a conversion zone under conversion conditions with fluent solid catalyst which is continuously passed through the conversion zone, the process which comprises contacting hydrocarbons with a relatively inert fluent solid of controlled heat content whose temperature is higher than that of the hydrocarbons to effect direct heat exchange between said hydrocarbons and the relatively inert fluent solid, mixing said hydrocarbons and relatively inert fluent solid with said catalyst within said conversion zone, contacting said hydrocarbons with at least a portion of the fluent solid catalyst within the conversion zone at conversion conditions, removing converted hydrocarbons from the conversion zone, and separating the fluent solid catalyst from the relatively inert solid.

2. The process of claim 1 in which the fluent solid catalyst is passed through the conversion zone as a moving bed.

3. In the cracking of a high-boiling hydrocarbon mixture that is less than 50 percent vaporized at 650° F. at atmospheric pressure, wherein the hydrocarbon mixture is contacted in a cracking zone under cracking conditions with a moving bed of fluent solid cracking catalyst which is continuously passed through the cracking zone, the process which comprises contacting said hydrocarbon mixture at least partially in liquid phase with relatively inert fluent solid having a controlled heat content and a temperature higher than that of the hydrocarbon mixture, incompletely vaporizing the hydrocarbon mixture by direct heat exchange with said solid to produce a resultant mixture of vapors of the hydrocarbon mixture and said solid carrying the unvaporized portion of the hydrocarbon mixture, mixing said resultant mixture and said catalyst within said cracking zone, forming a downwardly moving bed of commingled catalyst and relatively inert solid, catalytically cracking vapors of the hydrocarbon mixture by passing them at conversion conditions through at least a portion of the fluent solid cracking catalyst within the cracking zone and concommittantly depositing coke on said catalyst, removing cracked hydrocarbon vapors from the cracking zone, forming two separate streams of fluent solid catalyst and of relatively inert fluent solid, burning off the coke on said catalyst by contacting it with an oxidizing gas in a regeneration zone, recycling the regenerated fluid solid cracking catalyst to the cracking zone, heating the relatively inert fluid solid in a zone other than the regeneration zone of said catalyst by oxidizing within the zone combustible material including carbonaceous material remaining on said solid to increase and adjust the heat content of said solid independently of the catalyst, and recycling the heated relatively inert fluent solid, whereby the heat content of the relatively inert fluent solid supplies heat for heating and cracking said hydrocarbon mixture.

4. The process of claim 3 wherein the fluent solid catalyst is mixed with the mixture of the relatively inert fluent solid and hydrocarbon mixture at a point intermediate in the vertical extent of a moving bed of the relatively inert fluent solid and wherein the cracked hydrocarbon vapors are removed substantially at the bottom of the cracking zone.

5. The process of claim 3 wherein the mixture of the relatively inert fluent solid and hydrocarbon material is mixed with a moving bed of fluent solid cracking catalyst at a point intermediate in the vertical extent of said moving bed of fluent solid cracking catalyst and wherein the cracked hydrocarbon vapors are removed at the top of the cracking zone.

6. In the cracking of a hydrocarbon mixture which has a dew point above 850° F. and an initial boiling point above 400° F. at atmospheric pressure, the process which comprises contacting said hydrocarbon mixture at least partially in the liquid phase with a relatively inert fluent solid having a controlled heat content and having a temperature higher than that of said hydrocarbon mixture, which relatively inert fluent solid consists of fine particles of a refractory material, incompletely vaporizing said hydrocarbon mixture by direct heat exchange with said relatively inert fluent solid and depositing the unvaporized portion of said hydrocarbon mixture on the surface of said solid, mixing the vapors of the hydrocarbon mixture and the relatively inert fluent solid carrying the unvaporized portion of the hydrocarbon mixture with fluent solid cracking catalyst in a cracking zone, which catalyst is in the form of particles coarser than the particles of the relatively inert fluent solid, forming a downwardly moving bed of commingled catalyst and relatively inert solid within said cracking zone, catalytically cracking the vapors of the hydrocarbon mixture by passage through at least a portion of said catalyst within the cracking zone at conditions included in the ranges, atmospheric to 100 pounds per square inch pressure, 700 to 1100° F., catalyst to oil ratio of 0.1 to 5, removing cracked hydrocarbon vapors from the cracking zone, separating said catalyst from said solid, heating the relatively inert fluent solid in a thermal treating zone exclusively of said catalyst by oxidizing combustible material within the thermal treating zone to increase the heat content of said relatively inert fluent solid, recycling the heated relatively inert fluent solid to the cracking zone, whereby the heat content of the relatively inert fluent solid supplies heat for heating and cracking said hydrocarbon mixture.

7. In the cracking of a hydrocarbon mixture having a dew point above 850° F. and an initial boiling point at atmospheric pressure above 400° F., the process which comprises introducing said hydrocarbon mixture partially in the liquid phase together with a relatively inert fluent solid into a cracking zone through which a fluent solid cracking catalyst is moving, which relatively inert fluent solid is refractory, has a specific heat greater than 0.15, is separable physically from said catalyst and is relatively inert in comparison to the catalytic activity of said catalyst, introducing said fluent solid together with the liquid portion of said hydrocarbon mixture into said cracking zone, mixing said fluent solid and said catalyst within the cracking zone, catalytically cracking hydrocarbon vapors by passing them at conversion conditions through at least a portion of the fluent solid catalyst within the cracking zone, removing cracked hydrocarbon vapors from the cracking zone, passing said fluent solid through said cracking zone under conditions such that the liquid hydrocarbon mixture associated with said fluent solid is converted to a coke-like material, separating said catalyst from said fluent solid, regenerating said catalyst in a regeneration zone and recycling it to said cracking zone, burning the coke-like material associated with said fluent solid in a zone from which said catalyst is excluded so that the heat content of said fluent solid is increased independently of the catalyst, and recycling said inert solid to the cracking zone at a temperature whereby the heat content of the relatively inert fluent solid supplies heat to said cracking zone.

8. In the cracking of a hydrocarbon mixture having a dew point greater than 850° F., wherein said hydrocarbon mixture is contacted in a cracking zone under conversion conditions of pressure, catalyst to oil ratio, and at temperatures between 800 and 1100° F. by fluent solid cracking catalyst which passes continuously through the cracking zone, cracks said hydrocarbon mixture, thereby accumulates a deposit of coke, is removed continuously from the cracking zone, is conveyed to a regeneration zone in which coke is burned off by an oxygen containing gas, is removed continuously from the regeneration zone, and recycled to the cracking zone, the improvement which comprises contacting said hydrocarbon mixture with a relatively inert fluent solid separable from said fluent catalyst, which relatively inert fluent solid is of a refractory nature capable of withstanding temperatures greater than 1000° F. said hydrocarbon mixture being at a temperature below 850° F. and said relatively inert fluent solid being at a temperature above 850° F., heating said hydrocarbon mixture at least to the temperature in said cracking zone by direct heat exchange with the relatively inert fluent solid, whereby incomplete vaporization is accomplished, introducing said relatively inert fluent solid together with the unvaporized portion of said hydrocarbon mixture into said cracking zone, and cracking said hydrocarbon mixture under said cracking conditions, by which improvement coking difficulties during the preheating of said hydrocarbon mixture are avoided.

9. The cyclic process which comprises contacting a hydrocarbon mixture at least partially in the liquid phase with relatively inert fluent solid having a controlled heat content and a temperature higher than that of said hydrocarbon mixture, said hydrocarbon mixture having a dew point above 850° F. and an initial boiling point above 400° F. at atmospheric pressure, incompletely vaporizing the hydrocarbon mixture by direct heat exchange with said fluent solid to produce a resultant mixture of vapors of the hydrocarbon mixture and said fluent solid carrying the unvaporized portion of the hydrocarbon mixture, mixing in a cracking zone said resultant mixture and fluent solid cracking catalyst separable from said relatively inert fluent solid, catalytically cracking said hydrocarbon vapors by passing them at cracking conditions through at least a portion of the fluent solid catalyst within the cracking zone, passing said fluent solid through said cracking zone under conditions such that unvaporized hydrocarbon mixture associated with said fluent solid is converted to a coke-like material, separating said catalyst from said fluent solid, burning the coke-like material associated with said fluent solid to increase the heat content of said fluent solid in a combustion zone, passing at least a portion of said fluent solid through a zone in which the heat content of the fluent solid passed therethrough is reduced, and returning the fluent solid so treated for further use in contacting said hydrocarbon mixture.

10. The process of claim 9 in which the zone in which the heat content of the fluent solid is reduced is an endothermic catalytic zone.

11. The process of claim 9 in which only a portion of said fluent solid is reduced in heat content, and said portion of fluent solid of reduced heat content is mixed with fluent solid of unreduced heat content from said combustion zone prior to contact with said hydrocarbon mixture.

12. In the cracking of hydrocarbons by contact in a cracking zone under cracking conditions with fluent solid catalyst which is continuously passed through the cracking zone, the process which comprises contacting hydrocarbons with relatively inert fluent solid of controlled heat content whose temperature is higher than that of the hydrocarbons to effect direct heat exchange between said hydrocarbons and the relatively inert fluent solid, mixing said hydrocarbons and relatively inert fluent solid with said catalyst within said cracking zone, contacting said hydrocarbons with at least a portion of the fluent solid catalyst within the cracking zone at cracking conditions, removing cracked hydrocarbons from the cracking zone, and separating the fluent solid catalysts from the relatively inert solid.

13. The process of claim 12 in which the fluent solid catalyst is passed through the conversion zone as a moving bed.

14. The process of claim 13 wherein the fluent solid catalyst is mixed with the mixture of the relatively inert fluent solid and hydrocarbon mixture at a point intermediate in the vertical extent of a moving bed of the relatively inert fluent solid and wherein the cracked hydrocarbon vapors are removed substantially at the bottom of the cracking zone.

15. The process of claim 13 wherein the mixture of the relatively inert fluent solid and hydrocarbon material is mixed with a moving bed of fluent solid cracking catalyst at a point intermediate in the vertical extent of said moving bed of fluent solid cracking catalyst and wherein the cracked hydrocarbon vapors are removed at the top of the cracking zone.

16. In the conversion of hydrocarbons by contact in a conversion zone under conversion conditions with fluent solid catalyst which is continuously passed through the conversion zone and is thereby concomittantly diminished in catalytic activity, the process which comprises contacting hydrocarbons with a relatively inert fluent solid of controlled heat content whose temperature is higher than that of the hydrocarbons to effect direct heat exchange between said hydrocarbons and the relatively inert fluent solid, mixing said hydrocarbons and relatively inert fluent solid with said catalyst within said conversion zone, contacting said hydrocarbons with at least a portion of the fluent solid catalyst within the conversion zone at conversion conditions, removing converted hydrocarbons from the conversion zone, and separating the fluent solid catalyst from the relatively inert solid, regenerating the fluent solid catalyst to increase the catalytic activity thereof, recycling regenerated catalyst to the conversion zone, thermally treating the relatively inert fluent solid to increase and adjust its heat content independently and exclusively of the catalyst, and recycling the relatively inert fluent solid to the conversion zone whereby the heat content of the relatively inert fluent solid supplies heat for heating and converting said hydrocarbons.

17. In the cracking of hydrocarbons by contact in a cracking zone under cracking conditions with fluent solid catalyst which is continuously passed through the cracking zone and is thereby concomittantly diminished in catalytic activity, the process which comprises contacting hydrocarbons with a relatively inert fluent solid of controlled heat content whose temperature is higher than that of the hydrocarbons to effect direct heat exchange between said hydrocarbons and the relatively inert fluent solid, mixing said hydrocarbons and relatively inert fluent solid with said catalyst within said cracking zone, contacting said hydrocarbons with at least a portion of the fluent solid catalyst within the cracking zone at cracking conditions, removing cracked hydrocarbons from the cracking zone, and separating the fluent solid catalyst from the relatively inert solid, regenerating the fluent solid catalyst to increase the catalytic activity thereof, recycling regenerated catalyst to the cracking zone, thermally treating the relatively inert fluent solid to increase and adjust its heat content independently and exclusively of the catalyst, and recycling the relatively inert fluent solid to the cracking zone whereby the heat content of the relatively inert fluent solid supplies heat for heating and cracking said hydrocarbons.

18. In the conversion of hydrocarbons by contact in a conversion zone under conversion conditions with fluent solid catalyst which is continuously passed through the conversion zone, the process which comprises contacting hydrocarbons with a relatively inert fluent solid of controlled heat content whose temperature is higher than that of the hydrocarbons to effect direct heat exchange between said hydrocarbons and the relatively inert fluent solid, mixing said hydrocarbons and relatively inert fluent solid with said catalyst within said conversion zone, contacting said hydrocarbons with at least a portion of the fluent solid catalyst within the conversion zone at conversion conditions, removing converted hydrocarbons from the conversion zone, and separating the fluent solid catalyst from the relatively inert solid, passing the separated fluent catalyst through a regeneration zone in which the catalytic activity of said catalyst is renewed, returning the regenerated catalyst to the conversion zone, adjusting the heat content of the relatively inert fluent solid separately from said catalyst and returning it to said conversion zone at a temperature different from the temperature of the fluent catalyst returned to said zone, whereby the relatively inert fluent solid by its flow through the system is used to transfer heat from one zone in the system to another zone in the system by direct heat exchange within said zones.

FRANK WILLIAM ROSE.
FREDERICK WALTER STEUBER.

REFERENCES CITED

The following references are of record in the file of this patent:

UNITED STATES PATENTS

| Number | Name | Date |
|---|---|---|
| 2,303,717 | Arveson | Dec. 1, 1942 |
| 2,325,611 | Keranen | Aug. 3, 1943 |
| 2,327,175 | Conn | Aug. 17, 1943 |
| 2,353,119 | Workman | July 4, 1944 |
| 2,376,564 | Upham et al. | May 22, 1945 |
| 2,378,531 | Becker | June 19, 1945 |
| 2,398,954 | Odell | Apr. 23, 1946 |

Certificate of Correction

Patent No. 2,441,170. May 11, 1948.

FRANK WILLIAM ROSE ET AL.

It is hereby certified that error appears in the printed specification of the above numbered patent requiring correction as follows: Column 3, line 31, for the word "hydrogen" read *hydrocarbon*; and that the said Letters Patent should be read with this correction therein that the same may conform to the record of the case in the Patent Office.

Signed and sealed this 30th day of November, A. D. 1948.

[SEAL]

THOMAS F. MURPHY,
*Assistant Commissioner of Patents.*

Disclaimer 2,441,170.—*Frank William Rose* and *Frederick Walter Steuber*, Swarthmore, Pa. HYDROCARBON CONVERSION BY CONTACT WITH ACTIVE CATALYST AND INERT SOLID HEAT CARRYING MATERIAL. Patent dated May 11, 1948. Disclaimer filed Sept. 14, 1949, by the assignee, *Houdry Process Corporation*.

Hereby disclaims claims 1, 12, 16, 17, and 18 of said patent.

Does not disclaim the phraseology or method of claim 1 as the same is incorporated in, limited by and made part of dependent claim 2; and does not disclaim the phraseology or method of claim 12 as the same is incorporated in, limited by and made part of dependent claims 13, 14, and 15.

[*Official Gazette October 18, 1949.*]